US 11,485,832 B2

(12) United States Patent
Traßl et al.

(10) Patent No.: US 11,485,832 B2
(45) Date of Patent: Nov. 1, 2022

(54) HIGH-TEMPERATURE FOAMS WITH REDUCED RESIN ABSORPTION FOR PRODUCING SANDWICH MATERIALS

(71) Applicant: Evonik Operations GmbH, Essen (DE)

(72) Inventors: Christian Traßl, Warmensteinach (DE); Thomas Richter, Darmstadt (DE)

(73) Assignee: Evonik Operations GmbH, Essen (DE)

( * ) Notice: Subject to any disclaimer, the term of this patent is extended or adjusted under 35 U.S.C. 154(b) by 328 days.

(21) Appl. No.: 16/767,269

(22) PCT Filed: Nov. 20, 2018

(86) PCT No.: PCT/EP2018/081839
§ 371 (c)(1),
(2) Date: May 27, 2020

(87) PCT Pub. No.: WO2019/101703
PCT Pub. Date: May 31, 2019

(65) Prior Publication Data
US 2020/0325298 A1 Oct. 15, 2020

(30) Foreign Application Priority Data
Nov. 27, 2017 (EP) ..................... 17203684

(51) Int. Cl.
*C08J 9/232* (2006.01)
*B29C 44/26* (2006.01)
(Continued)

(52) U.S. Cl.
CPC ........... *C08J 9/232* (2013.01); *B29C 44/3415* (2013.01); *B29C 44/445* (2013.01);
(Continued)

(58) Field of Classification Search
CPC . C08J 9/232; C08J 9/36; C08J 2203/22; C08J 2205/10; C08J 2379/08;
(Continued)

(56) References Cited

U.S. PATENT DOCUMENTS 4,960,549 A * 10/1990 Brooks .................. B29C 44/50
264/53
6,358,459 B1 3/2002 Ziegler et al.
(Continued)

FOREIGN PATENT DOCUMENTS

| CN | 104114624 | 10/2014 |
|----|-----------|---------|
| DE | 196 40 130 | 4/1998 |

(Continued)

OTHER PUBLICATIONS

Machine Translation of DE 10 2015 017 075, Jun. 19, 2019, (reference previously filed).
(Continued)

*Primary Examiner* — Kara B Boyle
(74) *Attorney, Agent, or Firm* — Grüneberg and Myers PLLC

(57) ABSTRACT

High-temperature foams are produced and used in the construction of aeroplanes, ships and rail and other vehicles. In particular, the foams are further processed into sandwich materials by joining with two outer layers. To this end, a novel process is used for producing high-temperature foams (HT foams) which are particularly suitable for producing such sandwich components for lightweight construction. This process achieves an improvement in the processability of the HT foams produced and a weight reduction of the sandwich materials. The HT foams are furthermore rigid particle foams which are markedly more economic to produce than rigid block foams. In particular, a reduction is brought about in resin absorption in fibre composite pro-
(Continued)

cesses through a process-related optimization of the surface constitution.

18 Claims, 2 Drawing Sheets

(51) Int. Cl.
    *C08J 9/36*     (2006.01)
    *B29C 44/34*     (2006.01)
    *B29C 44/44*     (2006.01)
    *B29C 67/20*     (2006.01)
    *B29K 79/00*     (2006.01)
    *B29K 81/00*     (2006.01)
    *B29K 105/04*     (2006.01)

(52) U.S. Cl.
    CPC .............. B29C 67/205 (2013.01); *C08J 9/36* (2013.01); *B29K 2079/085* (2013.01); *B29K 2081/06* (2013.01); *B29K 2105/04* (2013.01); *C08J 2203/22* (2013.01); *C08J 2205/10* (2013.01); *C08J 2379/08* (2013.01); *C08J 2381/06* (2013.01)

(58) Field of Classification Search
    CPC .............. C08J 2381/06; B29C 44/3415; B29C 44/445; B29C 67/205; B29C 44/5636; B29C 44/36; B29C 44/58; B29K 2079/085; B29K 2081/06; B29K 2105/04; C08L 81/06; B29L 2031/30
    See application file for complete search history.

(56) References Cited

U.S. PATENT DOCUMENTS

| | | | |
|---|---|---|---|
| 6,461,732 | B1 | 10/2002 | Wittmann et al. |
| 2008/0234400 | A1 | 9/2008 | Allmendinger et al. |
| 2014/0343184 | A1 | 11/2014 | Axelrad et al. |
| 2015/0024187 | A1 | 1/2015 | Kutluoglu et al. |
| 2017/0334107 | A1 | 11/2017 | Bhargava et al. |
| 2020/0207939 | A1 | 7/2020 | Traßl et al. |

FOREIGN PATENT DOCUMENTS

| | | | | |
|---|---|---|---|---|
| DE | 19860611 | | 3/2000 | |
| DE | 20 2010 010 411 | U1 | 3/2011 | |
| DE | 20 2010 010 411 | U1 | 4/2011 | |
| DE | 10 2015 017 075 | | 9/2016 | |
| EP | 1 155 799 | | 11/2001 | |
| EP | 1155799 | A1 * | 11/2001 | ......... B29C 44/0407 |
| GB | 2494484 | | 3/2013 | |
| RU | 2205756 | C2 | 6/2003 | |
| WO | 2005/105404 | | 11/2005 | |
| WO | 2017010872 | | 1/2017 | |
| WO | 2017/125412 | | 7/2017 | |
| WO | WO-2017125412 | A1 * | 7/2017 | ............ B29C 33/00 |
| WO | 2019/101667 | | 5/2019 | |
| WO | 2019/101704 | | 5/2019 | |

OTHER PUBLICATIONS

U.S. Appl. No. 15/733,134, filed May 26, 2020, Traßl et al.
U.S. Appl. No. 16/640,626, filed Feb. 20, 2020, 2020/0207939, Traßl et al.
U.S. Appl. No. 16/767,240, filed May 27, 2020, Traßl et al.
Tant et al., "High Temperature Properties and Applications of Polymeric Materials", ACS Symposium Series, American Chemical Society, Washington DC, 1995, pp. 1-20.
International Search Report dated Feb. 11, 2019 in PCT/EP2018/081839, with English translation, 5 pages.
Written Opinion dated Feb. 11, 2019 in PCT/EP2018/081839.
European Search Report dated Jun. 26, 2018 in EP 17203684.0.

* cited by examiner

HIGH-TEMPERATURE FOAMS WITH REDUCED RESIN ABSORPTION FOR PRODUCING SANDWICH MATERIALS

CROSS-REFERENCE TO RELATED APPLICATIONS

This application is a National Stage entry under § 371 of International Application No. PCT/EP2018/081839, filed on Nov. 20, 2018, and which claims the benefit of European Application No. 17203684.0, filed on Nov. 27, 2017. The contents of each of the priority applications are incorporated herein by reference in their entireties.

BACKGROUND OF THE INVENTION

Field of the Invention

The present invention relates to the field of producing high-temperature foams, such as are used in the construction of aeroplanes, ships and rail and other vehicles, in particular further processed into sandwich materials by joining with two outer layers. To this end there is provided a novel process for producing high-temperature foams (HT foams) which are particularly suitable for producing such sandwich components for lightweight construction. This process achieves an improvement in the processability of the HT foams produced according to the invention and a weight reduction of the sandwich materials. The HT foams are furthermore rigid particle foams which are markedly more economic to produce than rigid block foams.

The present invention in particular brings about a reduction in resin absorption in fibre composite processes through a process-related optimization of the surface constitution.

Discussion of the Background

Particle forms consist of a multiplicity of individual polymer foam beads which in a contouring mould are sintered at the interfaces by supplying energy. This affords a characteristic surface as is apparent in FIG. 1 in the example of a moulding made of expanded polypropylene (EPP). The boundaries of the individual foam pearls are still clearly apparent in the moulding.

In addition, it is a consequence of the process that some of the air used for the filling procedure always remains in the mould cavity, thus resulting in voids between the foam beads. The prior art relating to particle foam moulds discloses methods of minimizing these problems. Thus for example structured mould surfaces can blur the particle boundaries for the eye of the beholder by imprinting a primary structure into the foam surface.

However, this is of only secondary relevance when the moulding is to be utilized as a core for a sandwich construction. Surfaces that are as closed as possible are desired here. There are three substantial reasons for this: A depiction of the defects in the foam core on the surface of the (fibre composite) outer layers must be avoided. This phenomenon is regarded as a quality defect. In addition, to exploit the maximum lightweight construction potential, penetration of resin into the core material is to be avoided as far as possible. Finally when using prepreg outer layers penetration of the resin into the voids at the foam surface creates a risk of so-called "dry" points in the outer layer. These are in particular points on the form core surface where the resin has completely penetrated into the interspaces and consolidation of the fibres is therefore insufficient. This can result in mechanical failure of the outer layers under load.

To solve these problems the prior art initially provides solutions taken purely from mould building to modify the foam surface as desired during foaming. FIG. 2 shows a characteristic surface produced by means of a process utilizing porous metal inserts in the mould interior. However, close inspection reveals that here too cavities cannot be avoided completely by means of this technology.

In order to realize a completely closed surface from such a material it is additionally necessary in a process step downstream of the foam particle sintering to heat the mould cavity to such an extent that the moulding surface of the foam becomes flowable, thus forming a compact skin on the foam. Given suitable process management this skin is completely closed and thus impervious to liquids.

The prior art discloses in relation to polypropylene foam (expanded PP/EPP) for example the use of a suitable coating material in the form of an inliner which must be specially produced. This inliner is melted in the course of the process for production of the foam. The inliner can therefore be joined to the EPP foam. Such a process is described for example in DE 20 2010 010 411 U1. In one variant according to DE 19 640 130 this film formed from the inliner may also be perforated and thus steam-permeable. Another variant according to EP 11 557 99 which is limited to expanded polystyrene (EPS) or EPP comprises additionally performing a steam treatment step. This melts the moulding surface and achieves a closed surface. All of these processes require additional process steps and in some cases additional input materials. There therefore remains a great technical need for a simpler alternative solution to the abovementioned technical challenges.

According to WO 2017 125412 it is also possible to utilize radiated energy to melt the foam surface. However, this procedure must be regarded as problematic on account of process- and safety-related challenges.

SUMMARY OF THE INVENTION

Against the background of the discussed prior art the problem addressed by the present invention was therefore that of providing a process, which is simpler and more effective compared to the prior art, for producing sandwich materials comprising a foam core made of particle foams produced from HT foams in such a way that the sandwich materials are as light as possible while exhibiting good mechanical stability and good bonding between the foam core and the outer layers.

A particular problem addressed was that of providing a novel process by means of which HT foams having a foam surface which is as closed as possible may be produced simply and at a high throughput rate.

It would be particularly preferable if the novel process for producing the HT foams could be provided in the form of a modification of in-mould foaming processes. This process shall be performable rapidly and with low energy consumption.

Other problems not explicitly discussed here can be derived from the prior art, the description, the claims or the exemplary embodiments.

DETAILED DESCRIPTION OF THE INVENTION

Figure 1:
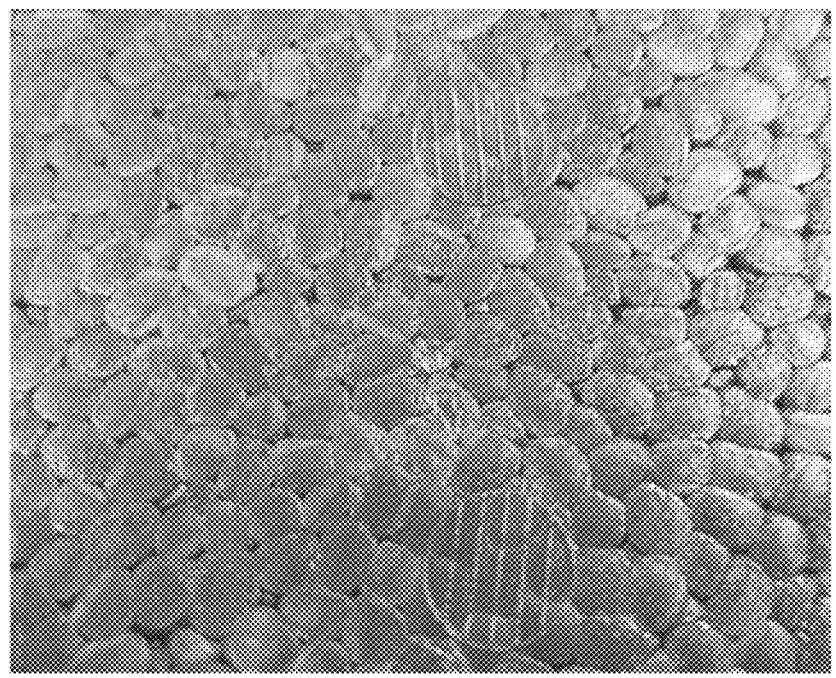
FIG. 1 shows characteristic surface of a particle foam moulding according to the prior art.
Figure 2:
FIG. 2 shows homogeneous and relatively closed but partially open particle foam surface by use of porous sintering metals in the mould according to the prior art.
Figure 3:
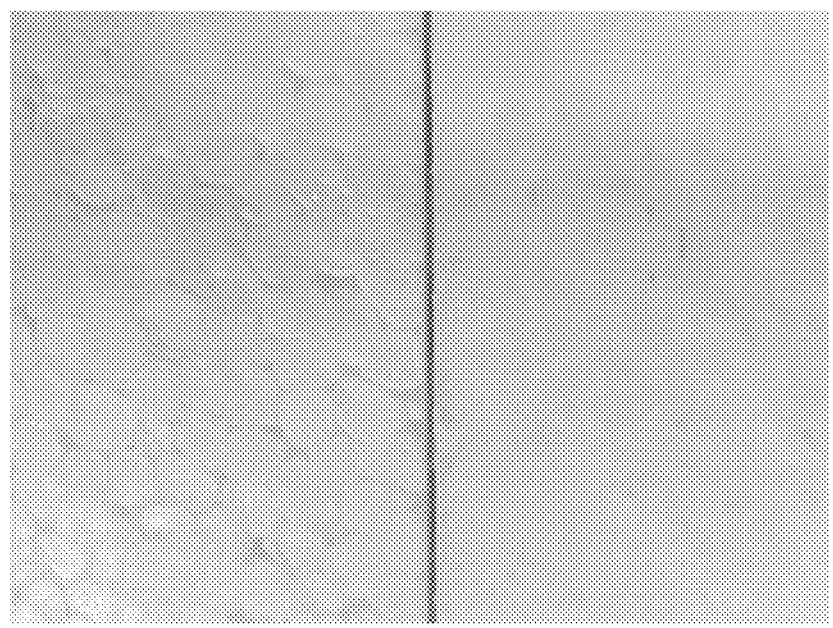
FIG. 3 shows comparison of the characteristic surfaces of a particle foam moulding according to the prior art and a particle foam moulding produced by a process modified in accordance with the invention but otherwise analogous.

The problems are solved by a novel process for producing HT foams suitable in particular for further processing into sandwich materials. The process according to the invention is in particular characterized in that particles of a high-temperature polymer are foamed and sintered in a mould at a sintering temperature $T_1$ to form an HT foam moulding. The aspect of foaming does not necessarily encompass the entire foaming procedure for producing the high-temperature foam. On the contrary, it is possible to employ particles which have been prefoamed to a certain extent and which by continued foaming are finally sintered into a moulding in the process. Furthermore, in particular additionally and as such particularly preferably, the foaming at the sintering temperature $T_1$ is not carried out to completion but rather is only concluded in the further process.

The process according to the invention is furthermore characterized in that the mould cavity containing the now formed foam moulding is subsequently heated to a temperature $T_2$ for 5 to 120 sec, preferably 15 to 90 sec, very particularly preferably up to 80 sec. This temperature $T_2$ is at least 10° C. above the sintering temperature $T_1$ and not more than 20° C. above the glass transition temperature of the employed HT polymer. The action of heat in the second step should be as short as possible to prevent collapse of the foam part which, surprisingly for a person skilled in the art, may be realized in the recited short time periods.

The sintering temperature $T_1$ of the HT polymer is preferably between 140° C. and 220° C., particularly preferably between 145° C. and 180° C. The sintering temperature is markedly below the glass transition temperature of the HT polymer, which may also be described as the base polymer, due to the effect of the blowing agent present and the steam used, which both serve as plasticizers.

The glass transition temperature of the HT polymer is preferably between 210° C. and 235° C., particularly preferably between 215° C. and 230° C. For an HT polymer which is not part of a blend the glass transition temperature is to be understood as meaning the glass transition temperature of the pure polymer without additives and in particular without a loading of blowing agent. For blends the glass transition temperature is to be understood as meaning a corresponding measured glass transition temperature of a phase in the polymer mixture without additives and in particular without a loading of blowing agent.

Finally, the temperature $T_2$ is preferably between 180° C. and 255° C. and particularly preferably between 190° C. and 240° C.

A particularly gentle yet still functioning variant of the present process is characterized in that the mould cavity is heated to a temperature $T_2$ which is at least 15° C. above the sintering temperature and below the glass transition temperature of the HT polymer for 15 to 90 sec.

The present process according to the invention surprisingly results in a reduction in resin absorption in sandwich cores consisting of high-temperature particle foams and composite outer layers. This effect is surprisingly realized by heating the mould cavity to such an extent that the polymer melts but is not damaged. Virtually complete avoidance of cavities on the material surface was a result that would be unexpected to a person skilled in the art.

Suitable high-temperature polymers (HT polymers) are in particular those having a glass transition temperature $T_g$ between 210° C. and 235° C. Materials having a lower glass transition temperature are often not suitable for fulfilling the desired profile of properties of a high-temperature foam. By contrast, materials with higher $T_g$ values are scarcely available. According to the invention the definition of the glass transition temperature relates to the most relevant (energetically greatest) thermal transition of a material. This means it is quite possible, even in this preferred embodiment, that the material has a second thermal transition below 210° C. This occurs for example in phase separating systems, in particular in polymer blends (polymer mixtures).

For materials for which no clearly disclosed glass transition temperature is known, said temperature may be determined by DSC (differential scanning calorimetry). In this regard, a person skilled in the art is aware that DSC is only sufficiently conclusive when, after a first heating cycle up to a temperature which is a minimum of 25° C. above the highest glass transition or meting temperature but at least 20° C. below the lowest decomposition temperature of a material, the material sample is kept at this temperature for at least 2 min. The sample is then cooled back down to a temperature at least 20° C. below the lowest glass transition or meting temperature to be determined, wherein the cooling rate should be not more than 20° C./min, preferably not more than 10° C./min. This is then followed after a further wait time of a few minutes by the actual measurement in which the sample is heated at a heating rate of generally 10° C./min or less to at least 20° C. above the highest melting or glass transition temperature.

A person skilled in the art may carry the further performance of DSC, for example with regard to sample preparation, according to DIN EN ISO 11357-1 and ISO 11357-2. DSC is, per se, a very stable method which can result in larger variances in measured results only in case of deviations in the temperature program.

A material that has proven particularly suitable for use as the HT polymer in the process according to the invention is polyethersulfone (PESU). As a pure polymer PESU has a glass transition temperature of about 225° C.

Alternatively and equally preferably polyphenylsulfone (PPSU) may be employed as the HT polymer. This material has a glass transition temperature of about 220° C.

In a particularly preferred variant of the present process the HT polymer is polyetherimide (PE). PEI has a glass transition temperature of about 217° C.

According to the invention it is also possible to employ blends in which a component as such would not alone be usable according to the invention because of an excessively low glass transition temperature for example. Such a mixture would then contain a second component which could also be employed on its own according to the invention. The proportion of the polymer employable according to the invention preferably accounts for more than 60% by weight, particularly preferably more than 75% by weight, of the mixture of the two polymers.

Further examples of blends employable according to the invention are mixtures of PPSU and PESU. Such blends may be employed with a PESU to PPSU ratio between 1:9 and 9:0.5, preferably 1:1 and 8.5:1.

To perform the process there are further aspects which are preferably to be realized. Various options may thus be contemplated to realize the high temperature stage of the heating phase to temperature $T_2$:

This may be realized by a second circuit through which the energy transfer medium, such as steam or heat-transfer oil, may be conducted. The mould building sector is familiar with a very wide variety of realization options, for example shell-like construction of the mould cavity, welding of pipes to the side of the mould facing away from the moulding or the use of generative methods such as for example selective laser sintering.

It is also possible to employ an induction-heatable inlay or an inner layer in the mould. The advantage of these two options is that rapid and controlled heating to the target temperature is ensured.

It is optionally possible in both variants to add a further circuit for rapid cooing of the surface.

In order that a homogeneous compact outer layer may be formed the volume reduction brought about by the transition from foam to compact polymer should be compensated. It is, however also possible to carry out the process without such compensation. However, qualitatively higher-quality results are achieved when a compensation is considered. For this purpose too there are various options.

The volume reduction may optionally be realized by a closing of the mould, thus reducing the cavity volume of the mould. This should be considered when designing the mould. A person skilled in the art would in this context refer to a so-called "breathable mould".

However, a better and simpler alternative involves utilizing the intrinsic expansion of the foam particles. This intrinsic expansion is effected by blowing agent contained in the foam cells. Preference is therefore given to an embodiment of the process according to the invention in which the particles of the high-temperature polymer are foamed in the mould to form the HT foam moulding at a sintering temperature $T_1$ between 140° C. and 180° C. in such a way that upon heating of the mould cavity to the temperature $T_2$ at least 5% by weight of the originally employed blowing agent still remains in the material.

As already explained above it is also possible according to the invention to employ prefoamed particles in the process. This gives rise to two different equally preferred process variants:

The first of these process variants is characterized in that prior to foaming the mould is filled with non-prefoamed HT polymer particles having a particle size between 0.5 and 5.0 mm.

The second of these process variants is characterized in that prior to foaming the mould is filled with prefoamed HT polymer particles having a maximum particle size between 1.0 and 10 mm and a bulk density of 30 to 200 kg/m$^3$.

Preferably, the foams according to the invention have a degree of foaming that amounts to a reduction in density compared to the unfoamed material of between 1% and 98%, preferably between 50% and 97%, particularly preferably between 70% and 95%. It is preferable when the foam has a density between 20 and 1000 kg/m$^3$, preferably 40 and 250 kg/m$^3$, especially preferably between 50 and 150 kg/m$^3$.

The to-be-foamed composition of the high-temperature polymer preferably comprises in addition to the polymer itself 0.5 to 10% by weight, preferably 1% to 9% by weight, of a blowing agent. It may further contain inter alia 0% to 10% by weight, preferably 1% to 5% by weight, of additives.

The additives may be in particular flame retardants, plasticizers, pigments, antistats, UV stabilizers, nucleating agents, impact modifiers, adhesion promoters, rheology modifiers, chain extenders, fibres and/or nanoparticles.

Flame retardants used are generally phosphorus compounds, in particular phosphates, phosphines or phosphites. Suitable UV stabilizers and/or UV absorbers are common knowledge to a person skilled in the art. HALS compounds, Tinuvins or triazoles are generally used for this purpose. Impact modifiers used are generally polymer particles comprising an elastomeric/flexible phase. These are often core-(shell-)shell particles having an outer shell which as such is no more than weakly crosslinked and as pure polymer would exhibit an at least minimal miscibility with the PEI. Any known pigments are employable in principle. It will be appreciated that particularly for relatively large amounts the effect on the foaming procedure should—as for all other additives employed in amounts above 0.1% by weight—be investigated. This may be carried out by a person skilled in the art with relatively little effort.

Suitable plasticizers, rheology modifiers and chain extenders are common knowledge to those skilled in the art from the production of films, membranes or mouldings from HT polymers or blends containing HT polymers and may therefore be transferred with little effort to the production of a foam from the composition according to the invention.

The optionally added fibres are generally known fibrous materials that may be added to a polymer composition. In a particularly suitable embodiment of the present invention, the fibres are PEI fibres. PES fibres, PPSU fibres or blend fibres, the latter from a selection of the polymers mentioned.

The nanoparticles which may be in the form of for example tubes, platelets, rods, spheres or other known forms are generally inorganic materials. They may perform various functions in the final foam at one and the same time. Thus these particles in some cases act as nucleating agents during foaming. The particles can further affect the mechanical properties as well as the (gas) diffusion properties of the foam. In addition the particles further contribute to low flammability.

In addition to the recited nanoparticles it is also possible for microparticles or sparingly miscible, phase-separating polymers to be included as nucleating agents. Men considering the composition the described polymers must be considered separately from the other nucleating agents, since the latter primarily exert influence on the mechanical properties of the foam, on the met viscosity of the composition and hence on the foaming conditions. The additional effect of a phase-separating polymer as a nucleating agent is an additional desired effect of this component, but not the primary effect in this case. Therefore, these additional polymers appear further up in the overall tally, separate from the other additives.

The additives may optionally also include up to 9% by weight of a further polymer component for adjustment of physical properties. The additional polymers may be for example polyamides, polyolefins, in particular PP, polyesters, in particular PET, other HT polymers, in particular sulfur-based polymers, for example PSU, PPSU, PESU or poly(meth)acrylimide.

The choice of blowing agent is relatively free and for a person skilled in the art is dictated in particular by the foaming method chosen, its solubility in the polymer and the foaming temperature. Suitable are for example alcohols, for example isopropanol or butanol, ketones, such as acetone or methyl ethyl ketone, alkanes, such as isobutane, n-butane, isopentane, n-pentane, hexane, heptane or octane, alkenes, for example pentene, hexene, heptene or octene, $CO_2$, $N_2$, water, ethers, for example diethyl ether, aldehydes, for example formaldehyde or propanal, hydro(chloro)fluorocarbons, chemical blowing agents or mixtures of a plurality of these substances.

Chemical blowing agents are relatively or completely non-volatile substances which undergo chemical decomposition under foaming conditions to form the actual blowing agent upon decomposition. tert-Butanol is a very simple example thereof in that it forms isobutene and water under foaming conditions. Further examples are $NaHCO_3$, citric acid, citric acid derivatives, azodicarbonamide (ADC) and/or compounds based thereon, toluenesulfonylhydrazine (TSH), oxybis(benzosulfohydroazide) (OBSH) or 5-phenyketrazole (5-PT).

Preferably, the particle foam according to the invention has a tensile strength to ISO1926 of greater than 0.4 MPa, an elongation at break to ISO1928 of between 5% and 15%, a shear modulus to ASTM C273 at room temperature of greater than 6 MPa, a shear resistance to ASTM C273 at room temperature of greater than 0.35 MPa, a compressive modulus to ISO 844 at room temperature of greater than 10 MPa, and a compressive strength to ISO 844 at room temperature of greater than 0.3 MPa. When employing the process for producing the particle foam described hereinbelow it is a simple matter for the person skilled in the art to comply with these mechanical properties while retaining the glass transition temperature and cell size according to the invention. In addition, it has also been found that, surprisingly, the particle foam according to the invention is usable with satisfaction of the fire protection specifications or fire properties according to FAR 25.852 that are of particular importance for use in the interior of an aircraft in the aviation industry.

The HT foams produced according to the invention may as described be further processed into mouldings or foam-core composite materials. Said foam mouldings or foam-core composite materials may in particular be used in mass production for example for bodywork construction or for interior trim in the automobile industry, interior parts in rail vehicle construction or shipbuilding, in the aerospace industry, in mechanical engineering, in the production of sports equipment, in furniture construction or in the construction of wind turbines.

EXAMPLES

The experiments were performed with polymer foam beads based on polysulfones (PESU and PPSU) and based on polyetherimide (PEI). Processing of the foam beads was carried out with a TVZ162/100 automatic moulding machine from Teubert Maschinenbau GmbH.

The particle foam based on PESU was foamed and sintered into mouldings in a temperature range of 145-165° C. The conversion of the surface into a skin took place in a temperature range of 185-235° C.

The invention claimed is:

1. A process for producing HT foams, comprising:
    foaming and sintering particles of a high-temperature (HT) polymer having a glass transition temperature, in a mould having a mould cavity, at a sintering temperature $T_1$ to form an HT foam moulding, and
    subsequently heating the mould cavity to a temperature $T_2$ at least 10° C. above the sintering temperature $T_1$ and not more than 20° C. above the glass transition temperature of the HT polymer for 5 to 120 sec.

2. The process according to claim 1, wherein the sintering temperature $T_1$ of the HT polymer is between 140° C. and 220° C., the glass transition temperature of the HT polymer is between 210° C. and 235° C., and the temperature $T_2$ is between 180° C. and 255° C.

3. The process according to claim 2, wherein the sintering temperature $T_1$ of the HT polymer is between 145° C. and 180° C., the glass transition temperature of the HT polymer is between 215° C. and 230° C., and the temperature $T_2$ is between 190° C. and 240° C.

4. The process according to claim 1, wherein the mould cavity is heated to the temperature $T_2$ for 15 to 90 sec.

5. The process according to claim 1, wherein the HT polymer is polyethersulfone (PESU).

6. The process according to claim 1, wherein the HT polymer is polyphenylsulfone (PPSU).

7. The process according to claim 1, wherein the HT polymer is polyetherimide (PEI).

8. The process according to claim 1, wherein the particles of the HT polymer are foamed in the mould to form the HT foam moulding at the sintering temperature $T_1$ between 140° C. and 180° C. in such a way that, upon heating of the mould cavity to the temperature $T_2$, at least 5% by weight of an originally employed blowing agent still remains in the HT foam moulding.

9. The process according to claim 1, wherein the mould cavity is heated to the temperature $T_2$, which is at least 15° C. above the sintering temperature $T_1$ and below the glass transition temperature of the HT polymer, for 5 to 120 sec.

10. The process according to claim 1, wherein prior to foaming, the mould is filled with non-prefoamed HT polymer particles having a particle size between 0.5 and 5.0 mm.

11. The process according to claim 1, wherein prior to foaming, the mould is filled with prefoamed HT polymer particles having a maximum particle size between 1.0 and 10 mm and a bulk density of 30 to 200 $kg/m^3$.

12. The process according to claim 1, wherein the HT foam moulding is processed into a sandwich material.

13. The process according to claim 3, wherein the HT polymer is polyethersulfone (PESU).

14. The process according to claim 3, wherein the HT polymer is polyphenylsulfone (PPSU).

15. The process according to claim 3, wherein the HT polymer is polyetherimide (PEI).

16. The process according to claim 11, wherein the HT polymer is polyethersulfone (PESU).

17. The process according to claim 11, wherein the HT polymer is polyphenylsulfone (PPSU).

18. The process according to claim 11, wherein the HT polymer is polyetherimide (PEI).

* * * * *